US009845788B2

(12) United States Patent
Schubert

(10) Patent No.: US 9,845,788 B2
(45) Date of Patent: Dec. 19, 2017

(54) WIND FARM HAVING A PLURALITY OF NETWORK FEED-IN POINTS

(71) Applicant: SENVION SE, Hamburg (DE)

(72) Inventor: Matthias Schubert, Rendsburg (DE)

(73) Assignee: SENVION SE, Hamburg (DE)

(*) Notice: Subject to any disclaimer, the term of this patent is extended or adjusted under 35 U.S.C. 154(b) by 380 days.

(21) Appl. No.: 14/410,374

(22) PCT Filed: Jun. 4, 2013

(86) PCT No.: PCT/EP2013/061513
§ 371 (c)(1),
(2) Date: Dec. 22, 2014

(87) PCT Pub. No.: WO2013/189733
PCT Pub. Date: Dec. 27, 2013

(65) Prior Publication Data
US 2015/0345468 A1  Dec. 3, 2015

(30) Foreign Application Priority Data
Jun. 22, 2012  (DE) .................. 10 2012 210 613

(51) Int. Cl.
G06F 19/00 (2011.01)
F03D 7/02 (2006.01)
(Continued)

(52) U.S. Cl.
CPC ........... F03D 7/0284 (2013.01); F03D 7/048 (2013.01); F03D 9/257 (2017.02); H02J 3/386 (2013.01); Y02E 10/723 (2013.01); Y02E 10/763 (2013.01)

(58) Field of Classification Search
CPC combination set(s) only.
See application file for complete search history.

(56) References Cited

U.S. PATENT DOCUMENTS

2005/0230980 A1* 10/2005 Brunet ................ F03D 1/00
290/44
2008/0195255 A1* 8/2008 Lutze ................ F03D 7/0284
700/291
(Continued)

FOREIGN PATENT DOCUMENTS

AU  2008264176  1/2009
DE  10136974  11/2002
(Continued)

OTHER PUBLICATIONS

Chaudhary, S.K. et al. "Wind Farm Grid Integration Using VSC Based HVDC Transmission—An Overview," IEEE Energy 2030 Conference, Nov. 17, 2008, Piscataway, NJ; pp. 1-7.
(Continued)

Primary Examiner — Kidest Bahta
(74) Attorney, Agent, or Firm — Morrison & Foerster LLP

(57) ABSTRACT

A wind farm comprises a plurality of wind turbines connected to a network internal to the wind farm, a network feed-in point in the network internal to the wind farm for feeding electrical power into a supply network, a control device associated with the network feed-in point designed to control the wind turbines feeding power into the supply network by the network feed-in point on the basis of measured values recorded at the network feed-in point, and at least one additional network feed-in point having an additional control device designed to control the wind turbines feeding power into the supply network by the additional network feed-in point on the basis of measured values recorded at the additional network feed-in point, wherein the network internal to the wind farm is designed to variably connect at least one wind turbine to one of the plurality of network feed-in points.

13 Claims, 1 Drawing Sheet

(51) Int. Cl.
*F03D 7/04* (2006.01)
*F03D 9/25* (2016.01)
*H02J 3/38* (2006.01)

(56) References Cited

U.S. PATENT DOCUMENTS

| | | | |
|---|---|---|---|
| 2009/0160187 A1* | 6/2009 | Scholte-Wassink | F03D 7/0284 290/44 |
| 2010/0156189 A1 | 6/2010 | Fishman | |
| 2010/0308585 A1* | 12/2010 | Jorgensen | F03D 7/0284 290/44 |
| 2012/0112713 A1* | 5/2012 | Kuehn | H02J 3/24 323/207 |
| 2013/0015660 A1* | 1/2013 | Hesselbæk | H02J 3/16 290/44 |

FOREIGN PATENT DOCUMENTS

| | | |
|---|---|---|
| DE | 102008028573 | 12/2009 |
| WO | WO-2011/070146 | 6/2011 |
| WO | WO-2012/048012 | 4/2012 |

OTHER PUBLICATIONS

International Search Report and Written Opinion dated Mar. 25, 2014, directed towards International Application No. PCT/EP2013/061513, 13 pages.

* cited by examiner

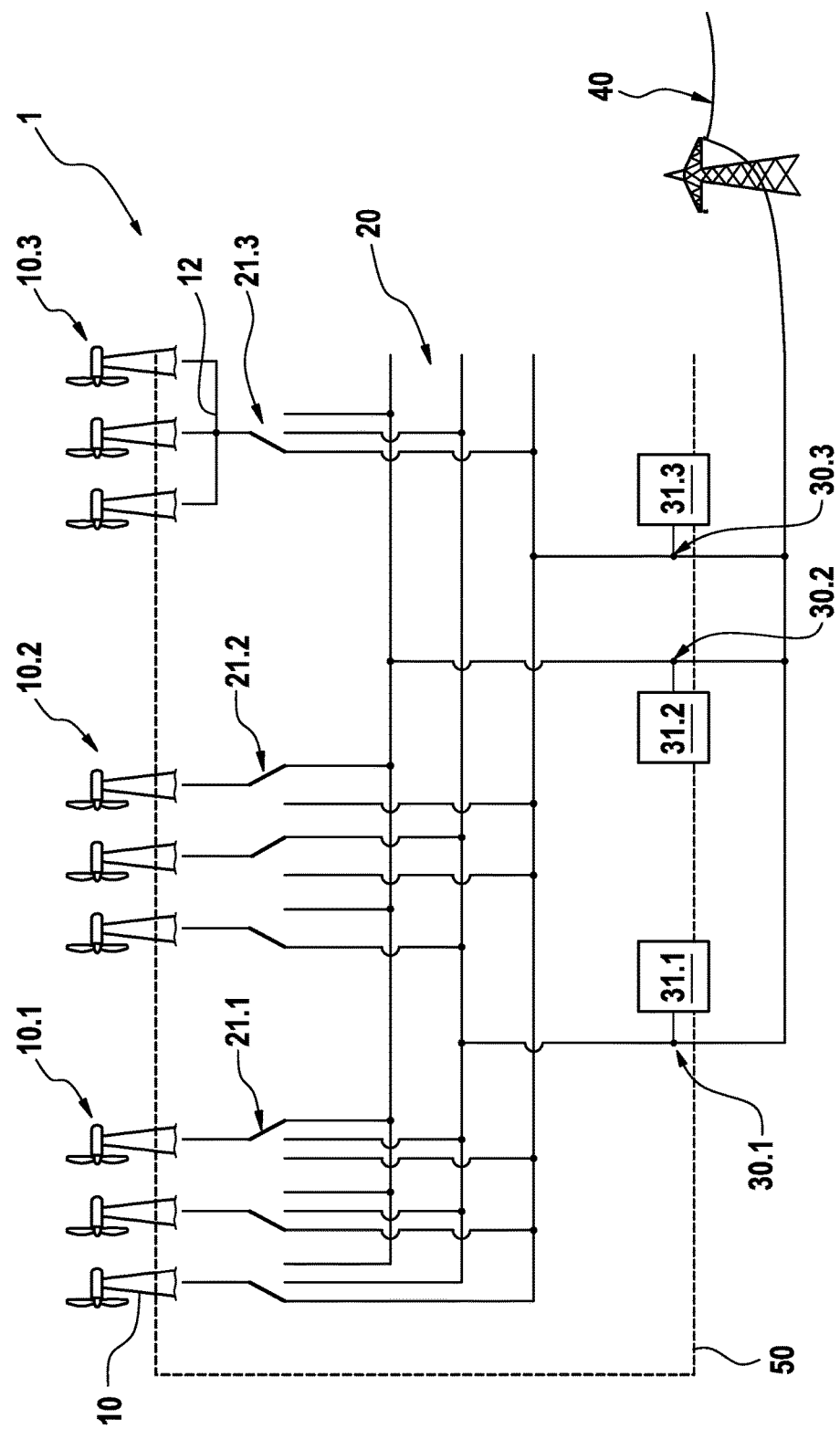

WIND FARM HAVING A PLURALITY OF NETWORK FEED-IN POINTS

REFERENCES TO RELATED APPLICATIONS

This application is a national stage application under 35 USC 371 of International Application No. PCT/EP2013/061513, filed Jun. 4, 2013, which claims priority to German Application No. 10 2012 210 613.8, filed Jun. 22, 2012.

FIELD OF THE INVENTION

The invention relates to a wind farm and to a method for operating a wind farm according to the invention.

BACKGROUND OF THE INVENTION

Wind farms comprise a plurality of wind turbines which convert wind power into electrical energy using a rotor and a generator connected thereto. The electrical energy passes, via a converter, into a network within the wind farm and, from there, into a supply network via a network feed-in point. A control device is provided at the network feed-in point, which control device detects various measured values, for instance voltages or current strength, at the network feed-in point and thus has an effect on the wind turbines such that setpoint values which are predefined at the network feed-in point, for example in respect of the active power and/or reactive power, are achieved. The setpoint values to be achieved can be automatically calculated by the control device or can be predefined by a superordinate entity, for example the network operator.

A wind farm having a plurality of subnetworks within the wind farm is known from DE 101 36 974. Power can be fed into subregions of the supply network via in each case a network feed-in point from each of the subnetworks within the wind farm. If the subregions of the supply network are connected to one another via a switching device, then the control devices at the network feed-in points are also connected to one another, so that the control of the power fed into the supply network via the respective network feed-in points can be mutually adjusted.

It is known from DE 10 2008 028 573 to provide redundant control devices at a network feed-in point. If a control device fails, a second control device can assume the tasks of the faulty control device.

A disadvantage of said prior art is that, in the event of failure of a network feed-in point, the wind turbines connected to said network feed-in point can no longer output electrical energy to the supply network and must be shut down.

SUMMARY OF THE INVENTION

An object of the present invention is to provide a wind farm and a method for operating a wind farm, in the case of which the disadvantages of the prior art no longer occur or only occur to a reduced extent.

This can be achieved by a wind farm and by a method as broadly disclosed herein. Advantageous developments are disclosed in the detailed embodiments described below.

Thus, the invention relates to a wind farm comprising a plurality of wind turbines which are connected to a network within the wind farm, wherein a network feed-in point for feeding electrical power into a supply network is provided in the network within the wind farm, and wherein a control device associated with the network feed-in point is provided, said control device being designed to control the wind turbines which feed power into the supply network via the network feed-in point on the basis of measured values recorded at the network feed-in point, wherein at least one further network feed-in point is provided with a further control device which is designed to control the wind turbines which feed power into the supply network via the further network feed-in point on the basis of measured values recorded at the further network feed-in point, wherein the network within the wind farm is designed for variable connection of at least one wind turbine to optionally one of the plurality of network feed-in points.

The invention also relates to a method for operating a wind farm, wherein the wind farm has a plurality of wind turbines which are connected to a network within the wind farm and comprises at least two network feed-in points and the network within the wind farm is designed for variable connection of at least one wind turbine to optionally one of the network feed-in points, wherein a wind turbine is controlled on the basis of measured values recorded at a first network feed-in point as long as the wind turbine is feeding power into a supply network via said first network feed-in point, and said wind turbine is controlled on the basis of measured values recorded at a second network feed-in point as long as the wind turbine is feeding power into the supply network via said second network feed-in point.

First of all, some terms which are used within the scope of the invention are explained.

"Network feed-in points" in the sense of the present invention refers to the point at which the network within the wind farm transitions to the supply network. Devices such as transformers, which transform the voltage from the network within the wind farm to the voltage of the supply network, or measuring devices can be provided at the network feed-in points. Network feed-in points can be arranged geographically or spatially separate from one another. However, it is also possible for a plurality of network feed-in points to be arranged spatially close or next to one another.

By way of example, it is possible for a plurality of transformers to be arranged next to one another in a building, which transformers can in each case transform the voltage from the network within the wind farm to the voltage of the supply network. In this case, each individual transformer can be arranged at a separate network feed-in point.

"Variable connection to optionally one of the plurality of network feed-in points" means that a wind turbine thus connected can feed its electrical power into the supply network optionally via one of a plurality of network feed-in points. A corresponding wind turbine can therefore feed the electrical power which it generates into the supply network optionally via a first network feed-in point, via a second network feed-in point, etc. In this case, it is not absolutely necessary for a wind turbine to be able to feed the electrical power which it generates via all of the network feed-in points in a wind farm. It is sufficient for a wind turbine to be able to be connected optionally to at least two network feed-in points of a plurality thereof. However, an individual switchable fixed connection with which a wind turbine is fixedly connected to an individual network feed-in point and, optionally, can be separated therefrom does not enable a "variable connection to optionally one of the plurality of network feed-in points" within the meaning of the invention.

The invention offers the advantage that the individual wind turbines in a wind farm can feed the power which they generate into the supply network via different, freely selectable paths, namely via the different network feed-in points. Thus, it is possible that, in the event of a failure of a network feed-in point, the power fed per se into the supply network via said network feed-in point can be rerouted into the supply network via another network feed-in point. The wind turbines connected to the faulty network feed-in point do not need to be disconnected in this case; rather, they can feed the electrical power which they generate into the supply network via another network feed-in point by virtue of a change in the connection in the network within the wind farm. The function of a faulty network feed-in point can therefore be assumed by another network feed-in point.

In addition to the variable connection of the wind turbines to optionally one of the network feed-in points, the invention provides that the control of the individual wind turbines always takes place on the basis of measured variables which are recorded at that network feed-in point via which a wind turbine also actually feeds its electrical power into the supply network. This is necessary, firstly, so that the control device associated with a network feed-in point can also actually adjust the setpoint values provided for the network feed-in point and, secondly, because what is consequently avoided is that a control device which is associated with a network feed-in point via which no electrical power is fed into the supply network attempts to control wind turbines on the basis of meaningless measured values. The control devices can also control the wind turbines such that maximum values, predefined at the network feed-in point associated with said wind turbines, for the power, the current and/or the voltage—as can be predefined, for example, by components such as transformers at the network feed-in points—are not exceeded.

In order that a control device can optimally control the wind turbines associated therewith, it is necessary for the control device to have information relating to what total nominal power and/or what total nominal reactive power the wind turbines which feed their electrical power via the network feed-in point associated with the control device have. This information can be provided to the control devices by a superordinate entity, for example a control computer.

In this case, the control computer is provided with information relating to the topography of the wind farm and the switching states of the network within the wind farm and/or the connections of the individual wind turbines to the network feed-in points. On the basis of this information, it is possible for the control computer to determine the total nominal power and/or the total nominal reactive power of the wind turbines connected to a particular network feed-in point and to transmit said power to the control device associated with said network feed-in point.

Alternatively, it is possible for the control devices to be designed to automatically calculate the total nominal power and/or the total nominal reactive power of the wind turbines which are connected at the network feed-in points which are respectively associated with said control devices. In this case, the control devices can be designed to retrieve the nominal powers of the corresponding wind turbines and to sum them to form the total nominal power and/or the total nominal reactive power which is necessary for the control of the individual wind turbines. The automatic calculation of the total nominal power and/or the total nominal reactive power can be done in response to an external signal, for example from a superordinate control computer, or at fixed time intervals.

It is particularly preferred if the control devices is designed to automatically calculate the total nominal power and/or the total nominal reactive power of the wind turbines which are connected at the network feed-in points which are respectively associated with said control devices in the event of a change in the connection of at least one wind turbine to the network feed-in points of the wind farm. The control device is therefore designed to recognize changes in the connections of the wind turbines to the network feed-in points and, consequently, to recalculate the total nominal power and/or total nominal reactive power. The wind farm is further automated as a result. The change in the connection of the wind turbines to the network feed-in points can be recognized, for example, using sensors which monitor the switching states of individual switching elements in the network within the wind farm or using sudden changes in measured values recorded at the network feed-in point.

The control devices at the individual network feed-in points are preferably configured such that, on the basis of setpoint values for the reactive power and/or active power, they act on the controller of the wind turbines which feed into the supply network via the respective network feed-in point or control the power output of said wind turbines. In this case, it is preferred if the total nominal power of the wind turbines connected to said network feed-in point is taken into account.

It is further preferred if the control devices are designed to transmit setpoint values to and/or to receive information from the wind turbines which are connected at the network feed-in points which are respectively associated with said control devices.

In order to achieve the greatest possible flexibility in the wind farm, it is preferred if all of the wind turbines of the wind farm are optionally connectable to one of the plurality of network feed-in points, preferably to one of all of the network feed-in points. However, it is also possible for a plurality of wind turbines to be combined to form a group, wherein said group is then variably connectable to optionally one of the plurality of network feed-in points.

To explain the method according to the invention, reference is made to the above statements relating to the wind farm according to the invention.

The invention will now be explained on the basis of an exemplary embodiment with reference to the appended drawing, in which:

BRIEF DESCRIPTION OF THE DRAWINGS

FIG. 1: shows a wind farm according to the invention.

DETAILED DESCRIPTION OF THE INVENTION

FIG. 1 illustrates a wind farm 1 according to the invention. The wind farm 1 comprises a plurality of wind turbines 10 which are connected to an electrical supply network 40 via a network 20 within the wind farm. The wind turbines 10 comprise a rotor which—when set in rotation by the wind—drives a generator. The electrical power generated by the generator is fed into the network 20 within the wind farm, optionally via a converter. The electrical power then passes from the network 20 within the wind farm at a network feed-in point 30.1, 30.2, 30.3 into the electrical supply network 40.

In the illustrated exemplary embodiment, which merely reproduces a schematic illustration of the invention, three network feed-in points 30.1, 30.2, 30.3 are provided at the network 20 within the wind farm. In this case, the network 20 within the wind farm is designed such that the individual wind turbines 10 can optionally be connected to one of the plurality of network feed-in points 30.1, 30.2, 30.3.

The wind turbines 10 of a first group of wind turbines 10.1 can in this case be individually optionally connected to one of the three network feed-in points 30.1, 30.2, 30.3. For this purpose, corresponding switching elements 21.1 are provided in the network 20 within the wind farm.

In the case of a second group of wind turbines, 10.2, the individual wind turbines 10 can in each case optionally be connected to two of the three available network feed-in points 30.1, 30.2, 30.3. The switching elements 21.2 necessary for this can be configured in a more simple manner than those for the first group of wind turbines 10.1, that is to say switching elements 21.1. However, by using the simpler switching elements 21.2, the flexibility of the possible circuits is restricted. Thus, in the case of the second group of wind turbines 10.2, it is no longer possible to connect each of the wind turbines 10 arbitrarily to one of the three network feed-in points 30.1, 30.2, 30.3.

The wind turbines 10 of the third group of wind turbines 10.3 are combined via a busbar 12. Proceeding from said busbar 12, a single switching element 21.3 is provided in order to optionally connect the wind turbines 10 of the group of wind turbines 10.3 jointly to one of the three network feed-in points 30.1, 30.2, 30.3.

In each case, a control device 31.1, 31.2, 31.3 is provided at the individual network feed-in points 30.1, 30.2, 30.3. In addition, measured variables relating to the electrical power fed into the electrical supply network 40 at the individual network feed-in points 30.1, 30.2, 30.3 in each case are recorded there, which measured variables are then further processed by the control devices 31.1, 31.2, 31.3 which are associated with the corresponding network feed-in points 30.1, 30.2, 30.3.

The control devices 31.1, 31.2, 31.3 are designed to control those wind turbines 10 which feed their electrical power into the supply network 40 via the network feed-in point 30.1, 30.2, 30.3 associated with the respective control device 31.1, 31.2, 31.3. In this case, the wind turbines 10 can be controlled such that desired reactive and/or active power values are achieved at the respective network feed-in point 30.1, 30.2, 30.3 via which they feed their electrical power. Corresponding control operations of a plurality of wind turbines 10 which feed their electrical power into a supply network 40 via a common network feed-in point 30 are known. The setpoint values for the reactive and/or active power can in this case be transmitted by the operator of the supply network 40 to the control devices 31.1, 31.2, 31.3 via a remote data transmission link (not illustrated).

The control devices 31.1, 31.2, 31.3 and the wind turbines 10 are connected to one another via a data transmission network 50. The control devices 31.1, 31.2, 31.3 can act on the controller of the individual wind turbines 10 via said data transmission network 50. In this case, the control devices 31.1, 31.2, 31.3 act only on those wind turbines 10 the electrical power of which passes into the electrical supply network 40 via the network feed-in point 30.1, 30.2, 30.3 associated with a control device 31.1, 31.2, 31.3.

In order that the control devices 31.1, 31.2, 31.3 can actuate the wind turbines 10 respectively associated therewith in as optimum a manner as possible, it is necessary for the control device 31.1, 31.2, 31.3 to have information relating to what total nominal power and/or total nominal reactive power the wind turbines 10 associated therewith have. Only in this way is it possible to control each of the wind turbines 10 in an optimum manner so that the desired reactive and/or active power values at a network feed-in point 30.1, 30.2, 30.3 are reached. In order to calculate the total nominal power and/or the total nominal reactive power of all wind turbines 10 associated with a network feed-in point 30.1, 30.2, 30.3, said wind turbines 10 can transmit their power values via the data transmission network 50 to the control device 31.1, 31.2, 31.3 associated with the respective network feed-in point 30.1, 30.2, 30.3. By adding the individual power values of the wind turbines 10, the control device 31.1, 31.2, 31.3 can then determine the total nominal power and take it into account during control.

If the switching states of the switching elements 21.1, 21.2, 21.3 change—a wind turbine 10 therefore no longer feeds its power into the electrical supply network 40 via a first network feed-in point but rather via a second network feed-in point—the total nominal power and/or the total nominal reactive power at the individual network feed-in points 30.1, 30.2, 30.3 also changes. The control devices 31.1, 31.2, 31.3 are designed to redetermine in such a case the change in the respective total nominal power and/or the total nominal reactive power of the network feed-in points 30.1, 30.2, 30.3 associated with said control devices. For this purpose, they receive an electronic signal from the controller device (not illustrated) which controls the switching elements 21.1, 21.2, 21.3, which electronic signal indicates the switchover of at least one of the switching elements 21.1, 21.2, 21.3. The individual control devices 31.1, 31.2, 31.3 then recalculate the respective total nominal power and/or the total nominal reactive power in the specified manner. In this way, it is ensured that the control devices 31.1, 31.2, 31.3 always control the wind turbines 10 associated therewith on the basis of the total nominal power and/or the total nominal reactive power of the wind turbines 10 which are presently connected to the network feed-in point 30.1, 30.2, 30.3 associated with said control devices.

When the switching states of the switching elements 21.1, 21.2, 21.3 change, it must be ensured that that network feed-in point 30.1, 30.2, 30.3 via which the power from one or more wind turbines is to be rerouted is configured for the total nominal power and/or total nominal reactive power arising at the time. This can be ensured by the controller device (not illustrated) controlling the switching elements 21.1, 21.2, 21.3 if said controller device has information relating to the topology of the network within the wind farm and the nominal power or nominal reactive power of the individual wind turbines. Alternatively, it is possible for the control device 31.1, 31.2, 31.3 to control the wind turbines 10 associated therewith such that, at the network feed-in point 30.1, 30.2, 30.3 of the respective control device 31.1, 31.2, 31.3, only so much power is fed into the electrical supply network 40 that the maximum permissible power of a network feed-in point 30.1, 30.2, 30.3 is not exceeded.

If the switching process of the switching elements 21.1, 21.2, 21.3 and the transfer of the control of one or more wind turbines 10 from a first to a second control device 31.1, 31.2, 31.3 does not or cannot take place immediately, provision can be made for the respective wind turbines to be operated using standard values for the corresponding time interval. In this way, it can be ensured that the wind turbines 10 can be operated in a controlled manner, even during those times in which they are not controlled (for example, during or directly after the change in the switching states of the switching elements 21.1, 21.2, 21.3) by a control device 31.1, 31.2, 31.3.

The invention claimed is:

1. A wind farm comprising a plurality of wind turbines which are connected to a network within the wind farm, a first network feed-in point in a network within the wind farm for feeding electrical power into a supply network, a first control device associated with the first network feed-in point configured to control wind turbines of the plurality of wind turbines that feed power into the supply network via the first network feed-in point based on measured values relating to electrical power fed into the electrical supply network at the first network feed-in point recorded at the first network feed-in point and at least a second network feed-in point with a second control device configured to control wind turbines of the plurality of wind turbines that feed power into the supply network via the second network feed-in point based on measured values relating to electrical power fed into the electrical supply network at the second network feed-in point recorded at the second network feed-in point, wherein the network within the wind farm is configured to variably connect at least one wind turbine to one of the first network feed-in point and the second network feed-in point.

2. The wind farm of claim 1, wherein the first and second control devices are configured to automatically calculate the total nominal power of the wind turbines which are connected at the network feed-in points which are respectively associated with the first and second control devices.

3. The wind farm of claim 1, wherein the first and second control devices are configured to automatically calculate the total nominal power of the wind turbines which are connected at the network feed-in points which are respectively associated with the first and second control devices in response to a change in the connection of at least one wind turbine to the network feed-in points.

4. The wind farm of claim 1, wherein the first and second control devices at the individual network feed-in points are configured based on setpoint values for one or both of the reactive power and active power, to act on the controller of the wind turbines which feed into the supply network via the network feed-in point.

5. The wind farm of claim 1, wherein the first and second control devices are configured to one or both of transmit setpoint values to and receive information from the wind turbines which are connected at the network feed-in points which are respectively associated with the first and second control devices.

6. The wind farm of claim 1, wherein all of the wind turbines are connectable to one of a plurality of network feed-in points that includes the first network feed-in point and the second network feed-in point.

7. A method for operating a wind farm, wherein the wind farm has a plurality of wind turbines which are connected to a network within the wind farm and comprises at least two network feed-in points and the network within the wind farm is configured to variably connect at least one wind turbine to one of the plurality of network feed-in points, the method comprising controlling a wind turbine based on measured values relating to electrical power fed into a supply network recorded at a first network feed-in point as long as the wind turbine is feeding power into the supply network via said first network feed-in point, and controlling the wind turbine based on measured values relating to electrical power fed into the supply network recorded at a second network feed-in point as long as the wind turbine is feeding power into the supply network via said second network feed-in point.

8. The method of claim 7, comprising calculating the total nominal power of the wind turbines which feed power into the supply network via a network feed-in point.

9. The method of claim 7, comprising controlling the wind turbines based on setpoint values for one or both of the reactive power and active power at the network feed-in point to which the wind turbines are respectively connected.

10. The wind farm of claim 4, wherein one or both of the total nominal power and the total nominal reactive power of the wind turbines connected to the respective network feed-in point is taken into account by the respective first and second control devices at the individual network feed-in points.

11. The wind farm of claim 5, wherein the first and second control devices are configured to detect changes in the respective connections of the wind turbines to the network feed-in points and, consequently, to recalculate one or both of the total nominal power and the total nominal reactive power of the wind turbines.

12. The wind farm of claim 1, wherein all of the wind turbines are connectable to all network feed-in points of a plurality of network feed-in points that includes the first network feed-in point and the second network feed-in point.

13. The method of claim 9, wherein one or both of the total nominal power and the total nominal reactive power of the wind turbines which feed power into the supply network via a network feed-in point are taken into account in the controlling of the wind turbines.

* * * * *

UNITED STATES PATENT AND TRADEMARK OFFICE
CERTIFICATE OF CORRECTION

| | | |
|---|---|---|
| PATENT NO. | : 9,845,788 B2 | Page 1 of 1 |
| APPLICATION NO. | : 14/410374 | |
| DATED | : December 19, 2017 | |
| INVENTOR(S) | : Matthias Schubert | |

It is certified that error appears in the above-identified patent and that said Letters Patent is hereby corrected as shown below:

In the Specification
At Column 6, Line number 34, please delete "that that" and insert --that--.

In the Claims
At Column 7, Claim number 1, Line number 6, please delete "point and" and insert --point, and--.

Signed and Sealed this
Twelfth Day of June, 2018

Andrei Iancu
*Director of the United States Patent and Trademark Office*